E. R. WAGNER.
FRONT FORK CLIP FOR VELOCIPEDES.
APPLICATION FILED APR. 8, 1920.
1,387,215.
Patented Aug. 9, 1921.
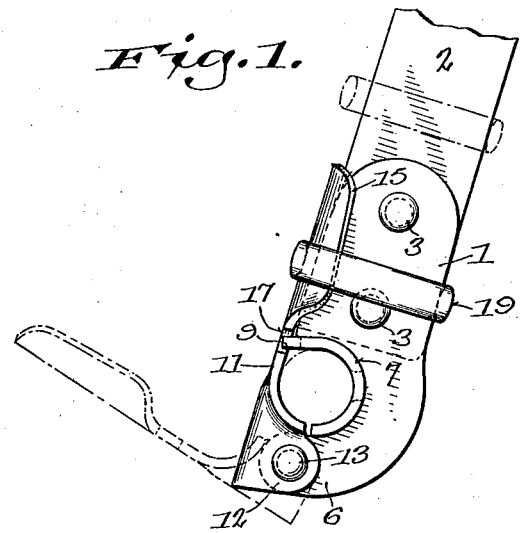
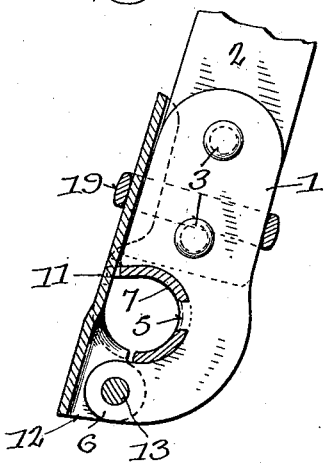
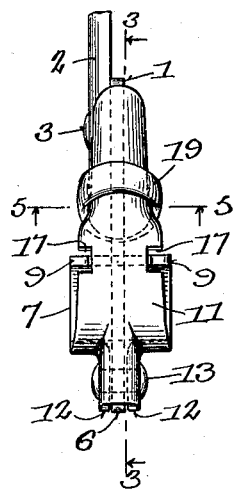
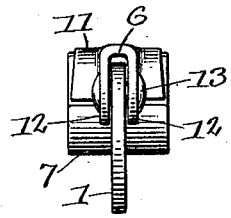
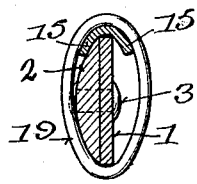
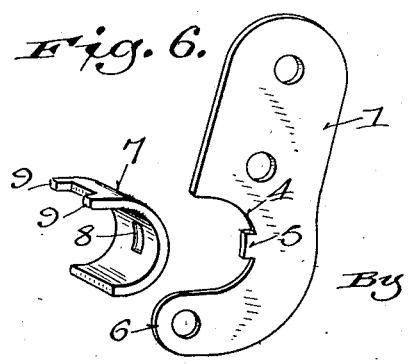
Inventor:
Edward R. Wagner,
By Bottum, Bottum, Hudnall & Lecher
Attorneys.

UNITED STATES PATENT OFFICE.

EDWARD R. WAGNER, OF MILWAUKEE, WISCONSIN, ASSIGNOR TO E. R. WAGNER MANUFACTURING COMPANY, OF NORTH MILWAUKEE, WISCONSIN, A CORPORATION OF WISCONSIN.

FRONT-FORK CLIP FOR VELOCIPEDES.

1,387,215.  Specification of Letters Patent.  Patented Aug. 9, 1921.

Application filed April 8, 1920. Serial No. 372,187.

*To all whom it may concern:*

Be it known that I, EDWARD R. WAGNER, a citizen of the United States, residing at Milwaukee, in the county of Milwaukee and State of Wisconsin, have invented certain new and useful Improvements in Front-Fork Clips for Velocipedes, of which the following is a specification, reference being had to the accompanying drawing, forming a part thereof.

The main objects of this invention are to produce from sheet metal a simple, convenient, light and strong front fork clip for velocipedes which when closed will securely hold the front wheel axle in place in the fork and from which the axle can be easily removed; and generally to improve the construction of clips of this class.

It consists in the construction, arrangement and combination of parts as hereinafter particularly described and pointed out in the claims.

In the accompanying drawing like characters designate the same parts in the several figures.

Figure 1 is a side elevation of a fork clip embodying the invention as applied to a fork arm; Fig. 2 is a front elevation of the clip as viewed from the left relative to Fig. 1; Fig. 3 is a longitudinal section on the line 3—3, Fig. 2; Fig. 4 is a lower end elevation of the clip; Fig. 5 is a cross section on the line 5—5, Fig. 2; and Fig. 6 is a perspective view of the attachment plate or member and semi-cylindrical axle bearing separated from each other.

The clip, the parts of which are stamped from heavy sheet metal, comprises an attachment plate or member 1, which is rigidly fastened flatwise to one side of a fork arm 2 by rivets 3, or other suitable means. It is formed in its front edge adjacent the lower end with a semi-circular seat or recess 4, and with a lug 5 projecting into the seat or recess. Below the seat or recess 4 the plate 1 is formed into a perforated ear 6. A semi-circular axle bearing 7 is fitted in said seat or recess and secured in place therein transversely to the plane of the plate 1, by the lug 5, which passes through a slot or opening 8 in the bearing and is upset therein. At the ends of its upper edge the bearing 7 is formed with lugs 9.

A cap member 11 is folded at one end and formed into ears 12 which embrace the ear 6 and are pivotally connected therewith by a rivet, pin or bolt 13, so that said member can be turned up as shown by full lines in Fig. 1, to close the open side of the bearing 7 and confine an axle therein, and can be turned down as indicated by dotted lines in the same figure, to release and remove the axle. Adjacent the end opposite the ears 12 the member 11 is folded to form lips or flanges 15, which embrace the front edge of the plate 1 and arm 2 when the clip is closed, to securely hold the members in proper relation to each other.

The cap member is formed in the sides with notches 17, which when the clip is closed, interlock with the lugs 9 on the axle bearing and help to hold the parts of the clip in place, preventing endwise displacement of the bearing 7 and downward displacement of the cap member and the release of the axle in case the rivet, pin or bolt 13 is broken or removed.

A locking ring, clasp or member 19, is fitted to slide down with a wedging action over the upper ends of the plate 1 and cap member 11, to hold the clip closed, as shown by full lines in Fig. 1. By sliding this ring or member upward on the fork arm 2, as indicated by dotted lines in Fig. 1, the cap member is released and may be turned down into position, as indicated by dotted lines, to release and permit the removal of the axle.

Variations in the details of construction and arrangement of parts may be made without departure from the principle and scope of the invention as defined in the following claims.

I claim:

1. In a front fork clip for velocipedes the combination of an attachment member adapted to be fastened to a fork arm and formed with a recess in one edge, a semi-cylindrical axle bearing fitted and secured in said recess transversely to the attachment member, a cap member folded to embrace the edge of the attachment member and pivoted thereto on one side of the recess, and means for holding the cap member in closed position.

2. In a front fork clip for velocipedes the combination of an attachment plate adapted to be fastened to a fork arm and formed in one edge with a semi-circular recess and with a lug extending into the recess, a semi-cylindrical axle bearing fitting into said recess transversely to the plate and having an opening engaged by the lug, a cap member pivoted to the plate at one side of the recess to close over the open side of the axle bearing, and means for locking the cap member in closed position.

3. In a front fork clip for velocipedes the combination of an attachment plate adapted to be fastened to a fork arm and formed in one edge with a recess, a semi-cylindrical axle bearing secured in said recess transversely to the plane of the plate, a cap member pivoted to said plate at one side of the recess and adapted when closed over the open side of the bearing to interlock therewith and with the plate to prevent endwise displacement of the bearing and to confine the axle therein, and means for holding the cap member in closed position.

4. In a front fork clip for velocipedes the combination of an attachment plate adapted to be fastened to a fork arm and formed in one edge with a semi-circular recess, a semi-cylindrical axle bearing secured in said recess transversely to the plane of said plate and formed at the ends on one edge with lugs, a cap member hinged to said plate on one side of the recess therein and adapted to close over the open side of the bearing between the lugs thereon, and means for releasably locking the cap member in closed position.

5. In a front fork clip for velocipedes the combination of an attachment plate adapted to be fastened to a fork arm and formed with a recess in one edge, a semi-cylindrical axle bearing fitted in said recess transversely to the plane of the plate and formed at the ends with lugs, a cap member pivoted to the plate at one side of the recess to close over the open side of the bearing and formed with notches to interlock with the lugs on the bearing when the clip is closed, and means for holding the cap member in closed position.

In witness whereof I hereto affix my signature.

EDWARD R. WAGNER.